No. 681,525. Patented Aug. 27, 1901.
J. YOUNG.
BEET HARVESTER.
(Application filed Feb. 13, 1901.)
(No Model.) 2 Sheets—Sheet 2.
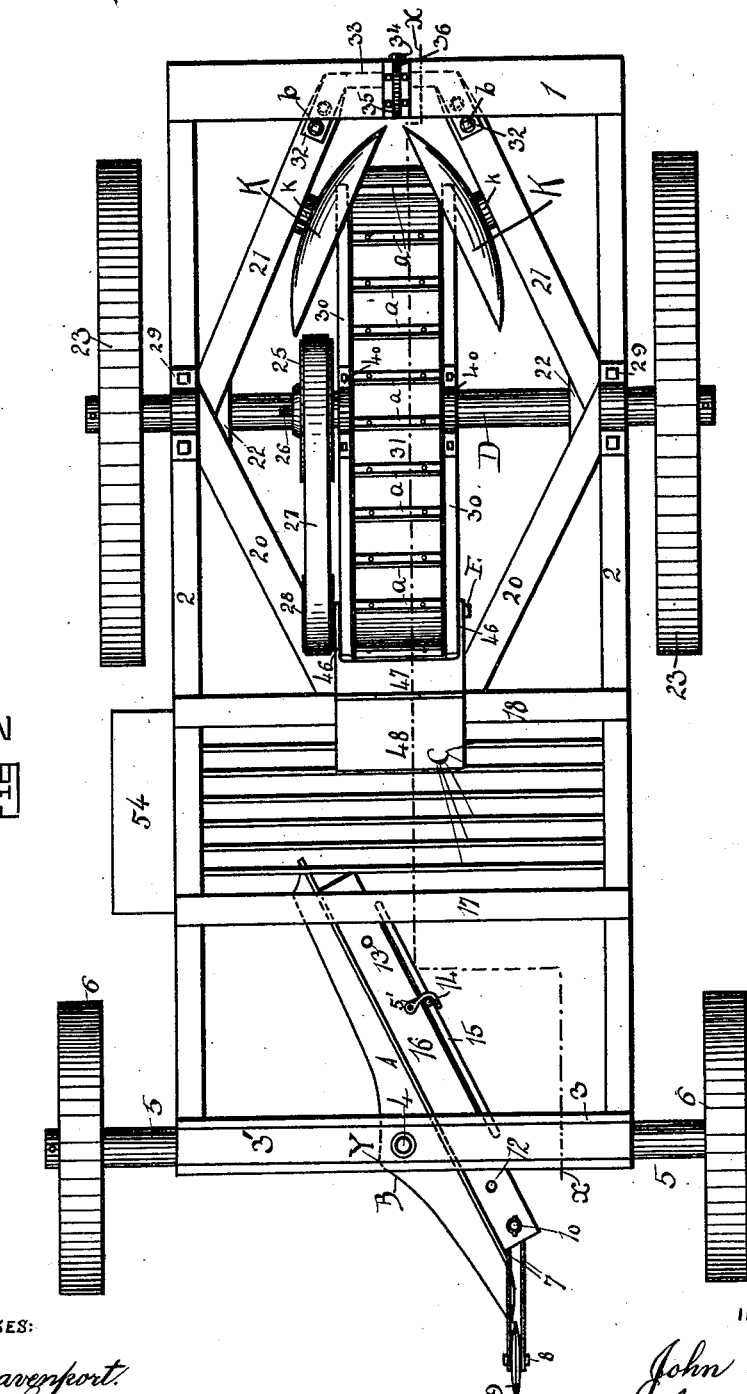
WITNESSES:
R. J. Davenport.
Agnes Levi.
INVENTOR.
John Young
PER Geo. W. Sues
ATTORNEY.

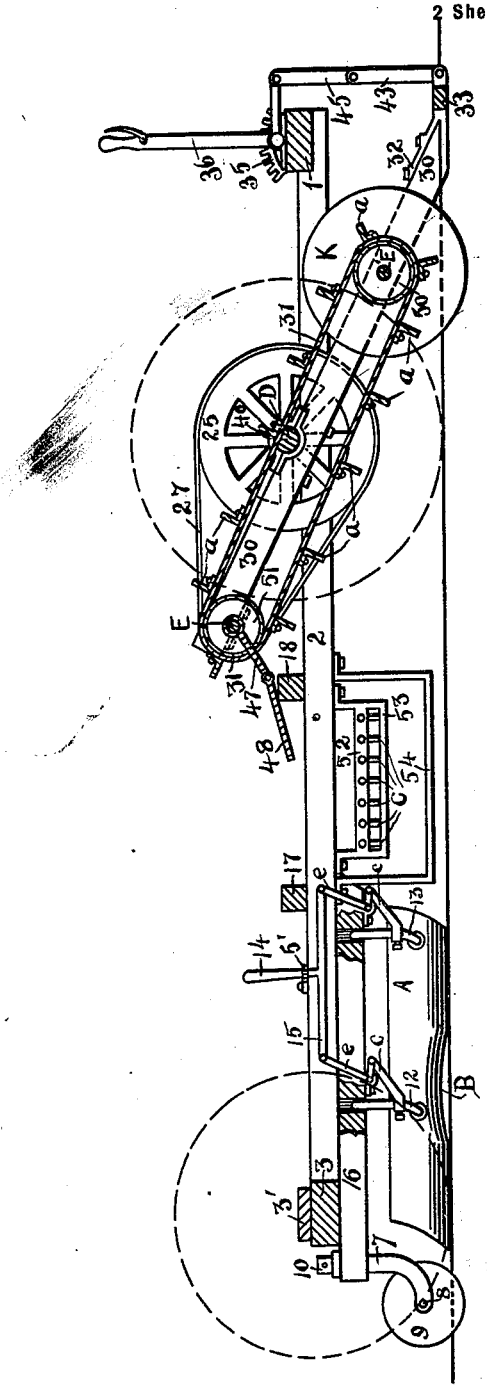

UNITED STATES PATENT OFFICE.

JOHN YOUNG, OF CALIFORNIA JUNCTION, IOWA.

BEET-HARVESTER.

SPECIFICATION forming part of Letters Patent No. 681,525, dated August 27, 1901.

Application filed February 13, 1901. Serial No. 47,176. (No model.)

*To all whom it may concern:*

Be it known that I, JOHN YOUNG, residing at California Junction, in the county of Harrison and State of Iowa, have invented certain useful Improvements in Beet-Harvesters; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in a beet topper and harvester.

The aim of my invention is to provide a machine arranged so that the same may be carried through a beet-field to remove the tops from the beets and at the same time harvest and elevate them.

In the accompanying drawings I have shown in Figure 1 a sectional view, drawn on lines $x$ $x$ of Fig. 2, disclosing a beet-harvester embodying my invention, while Fig. 2 shows a top view of a beet-harvester constructed according to my invention.

My beet topper and harvester embodies a frame comprising the side bars 2, the forward transverse bar 3, and the rear transverse bar 1. Intermediately this frame is strengthened by means of the transverse braces 17 and 18. Secured to the forward end piece 3 is an axle 3', to the hubs 5 of which are secured the wheels 6. This axle is held by means of the king-bolt 4, as is more clearly shown in Fig. 2. Extending transversely across the rear part of the frame and working within bearings 29 is the supporting-axle D, which is revolubly held within the bearings and has secured to it the wheels 23. This axle D acts as a driving-shaft for my beet topper and harvester. Movably secured to this shaft D is a frame comprising the side bars 20 20 and 21 21, which are secured to the side bars 30 30. To further strengthen these bars 20 and 21, I use the braces 22 22. These side pieces 30 are provided with the bearings 40, by means of which they are movably secured to the axle D. At the rear the bars 21 21 are united by means of a drag-shoe, the ends 32 of which are provided with the bolts $b$, as is clearly shown.

From the construction as far as described it will be noticed I provide a rectangular frame provided in front with the pivoted axle 3' and in the rear with the revolubly-supported axle D, upon which axle is pivotally held a frame comprising the side pieces 20 and 21, which are connected by means of the side pieces 30 and the drag-shoe 33. In order to control, lock, and hold this pivoted frame, I provide the drag-shoe 33 with the toggle-bar 43, which bar is pivotally connected to the upper bar 45, which bar in turn is secured to the lever 36, secured to an ordinary sector 35, as is usual in the art. This adjusting-lever 36 is secured to the end cross-bar 1. By means of this lever 36 the frame may be given any suitable position.

Working across the transverse side pieces 30 30, referring now to Fig. 1, are the upper shaft E and a lower shaft E', which are provided with the drums 51 50, over which drums works an endless apron 31, provided with the riffles $a$. The shaft E upon one end is provided with the pulley 28, over which passes a belt 27, which belt works over a second pulley 25, secured to the shaft D by means of an ordinary key 26. As the shaft D revolves it revolves the apron 31.

Secured to the shaft E by means of the ears 46 is a plate 47, to which plate is hinged a shield 48, which shield works upon the transverse bar 18 and terminates above a grate C, which grate is held by means of the brackets 52 and 53, as is shown in Fig. 1. This grate is made to incline toward one side of the machine and empties above a table 54, upon which may be placed suitable receptacles, such as baskets.

Pivotally held within the frame portions 21 21, upon suitable stub-axles $k$, are the disks K, which are placed at an angle to one another and in such a manner that they inclose the lower end of the endless elevator 31. These disks, which are plows by means of which the beets are plowed or removed out of the ground, have their rear ends placed very near together, as is shown in Fig. 2, so that they scoop out the ground containing the beets as they are revolved in being dragged through the earth. These disks are of suitable size and are properly dished, so that they readily operate to carry the beets out of the ground.

Secured to the forward transverse bar 3 is the bar 16, and this bar is provided with two openings, as is shown in Fig. 1, within which are held the holders 12 and 13, which are secured to the beet-topping knife A, as is shown. This knife is of a peculiar construction, as is shown in the figures, and is advanced so that it presents a long dragging knife-edge to separate the beet-tops as they are encountered. In order that the beets which may project beyond the ground may not be injured by this topping-knife A, I provide this knife with an upwardly-extending bowed portion B, as will be clearly understood in referring to Fig. 1, so that the knife extends a suitable distance above the ground. In order that the knife may more fully engage the beet-tops, the knife is provided with a bulge Y. In order that this knife may not drag any trash along with it, I provide the forward part of the bar 16 with a fixed bracket 7, within the forward end of which runs a disk cutter 9, held by means of the pin 8, which extends a suitable distance into the ground, as is shown in Fig. 1. The upper end 10 of the bracket 7 extends beyond the bar 16, as shown in Fig. 1.

Extending from the bars 12 and 13 are the brackets c, which are secured to the levers e, and these levers in turn are united by the bar 15, from which extends the handle 14, so that this beet-topping knife may be raised and lowered. This knife is guided by means of the bars 12 and 13, which are made of sufficient strength. When not in use, the lever 14 is thrown up and held by means of any suitable catch—as the hook 5', for instance. In Fig. 2 this lever 14 is shown in a locked position.

The operation of my device would be as follows: As the harvester is carried through the field the cutter 9 would advance a certain distance below the earth's surface. The beet-topping knife A would then be properly adjusted, so as to remove the beet-tops. The disks K would have been adjusted by means of the lever 36, so as to enter the ground a suitable distance, so that as they revolve they would carry up with a scoop movement the earth and beets. This earth and the beets would be prevented from clogging within this hollow disk K by means of the endless elevator 31, which would carry both the earth and the beets upward. From the endless elevator the beets would fall upon the plate 47 and from this upon the shield 48, from which the beets and earth would drop upon the grate C. The dropping of the beets would loosen the earth, and the beets would then gravitate toward the lower side of the grate C and be collected there in any suitable manner. When not in use, the lever 36 is thrown forward, so that the cutters K are thrown out of the ground, the plates 47 and 48 being pivotally connected, enabling the forward end of the elevator to dip down when not in use.

The construction of my device is exceedingly simple and the parts are readily adjusted.

Having thus described my said invention, what I claim as new, and desire to secure by United States Letters Patent, is—

1. The combination with a wheel-supported carriage, of a beet-topping knife adjustably held below said carriage at the forward end, said knife being provided with a bulging portion, a pivoted frame adjustably held near the rear end within said carriage, disks within the lower end of said pivoted frame, and an endless elevator working within said pivoted frame, said elevator ending between said cutters.

2. The combination with a wheeled carriage, of a beet-topping knife provided with a bulge and adjustably secured to the forward end of said carriage, said beet-topping knife being set at an angle, a cutter at the forward end of said beet-topping knife, a pivoted frame adjustably held within the rear end of said carriage, disk plows secured to the lower end of said pivoted frame, an endless elevator terminating between said disk plows, and a grate positioned below the upper end of said endless elevator all arranged substantially as and for the purpose set forth.

JOHN YOUNG.

In presence of—
GEORGE W. SUES,
R. J. DAVENPORT.